US005241013A

United States Patent [19]

Rempel et al.

[11] Patent Number: 5,241,013

[45] Date of Patent: Aug. 31, 1993

[54] CATALYTIC HYDROGENATION OF NITRILE RUBBER

[75] Inventors: Garry L. Rempel; Neil T. McManus; Xiang-Yao Guo, all of Waterloo, Canada

[73] Assignee: Polysar Rubber Corporation, Sarnia, Canada

[21] Appl. No.: 939,238

[22] Filed: Sep. 2, 1992

[51] Int. Cl.[5] .................... C08F 8/04

[52] U.S. Cl. .................... 525/338; 525/332.3; 525/339

[58] Field of Search .................... 525/338, 339, 332.3

[56] References Cited

U.S. PATENT DOCUMENTS

| | | | |
|---|---|---|---|
| 3,700,637 | 10/1972 | Finch | 260/83.3 |
| 4,384,081 | 5/1983 | Kubo et al. | 525/339 |
| 4,464,515 | 8/1984 | Rempel et al. | 525/338 |
| 4,503,196 | 3/1985 | Rempel et al. | 525/338 |
| 4,631,315 | 12/1986 | Buding et al. | 525/338 |
| 4,812,528 | 3/1989 | Rempel et al. | 525/338 |
| 4,816,525 | 3/1989 | Rempel et al. | 525/338 |
| 5,057,581 | 10/1991 | Rempel et al. | 525/338 |
| 5,075,388 | 12/1991 | Rempel et al. | 525/338 |

FOREIGN PATENT DOCUMENTS

| | | |
|---|---|---|
| 1558491 | 1/1980 | United Kingdom . |

*Primary Examiner*—Paul R. Michl
*Assistant Examiner*—Edward Cain
*Attorney, Agent, or Firm*—Joseph C. Gil; Godried R. Akorli

[57] ABSTRACT

An improved process is provided for the catalytic hydrogenation of nitrile rubber in solution in an organic medium using a ruthenium catalyst, the improvement being that the hydrogenation is undertaken in the presence of water and a selected inorganic additive whereby the molecular weight increase in the hydrogenation process is minimized and controlled.

8 Claims, No Drawings

CATALYTIC HYDROGENATION OF NITRILE RUBBER

FIELD OF THE INVENTION

The present invention relates to an improved process for the production of hydrogenated nitrile rubber.

BACKGROUND OF THE INVENTION

It is well known that the carbon-carbon double bonds in a nitrile rubber, the nitrile rubber being a polymer comprising a $C_4$-$C_6$ conjugated diolefin and a $C_3$-$C_5$ unsaturated nitrile, can be selectively hydrogenated, without significant hydrogenation of the C≡N bonds, by treatment of the polymer with hydrogen in the presence of selected catalysts—for example, British Patent 1,558,491; U.S. Pat. Nos. 3,700,637; 4,384,081; 4,464,515; and 4,503,196. The use of ruthenium catalysts for the hydrogenation of nitrile rubbers is described in U.S. Pat. Nos. 4,631,315; 4,816,525, 4,812,528 and 5,057,581. The use of certain additives useful in the ruthenium catalysed hydrogenation of nitrile rubbers is described in U.S. Pat. No. 5,075,388.

In the hydrogenation of nitrile rubbers, it has been found that, depending on the nature of the catalyst, the solvent used in the hydrogenation process and the reaction conditions used for the hydrogenation, the molecular weight of the hydrogenated nitrile rubber increases during the hydrogenation process. The molecular weight increase is believed to be due to an interaction between two or more polymer molecules. The molecular weight increase is particularly noticeable when certain of the ruthenium catalysts are used and the interaction between polymer molecules can be such that the hydrogenated polymer contains gelled (crosslinked) or insoluble polymer. Although a slight increase in molecular weight can be tolerated, if the molecular weight of the hydrogenated polymer is too high this causes it to be of low acceptability to the purchaser who uses it to manufacture products, such as hoses, gaskets, belts, etc.

Accordingly, the present invention is directed to an improved process for the hydrogenation of nitrile-type polymers wherein the molecular weight increase in the hydrogenation process is minimized and controlled.

SUMMARY OF THE INVENTION

The present invention provides an improved process for the production of hydrogenated nitrile rubber wherein a nitrile rubber which is a polymer comprising a conjugated $C_4$-$C_6$ diolefin and a $C_3$-$C_5$ unsaturated nitrile is hydrogenated in solution in an organic solvent in the presence of a divalent ruthenium catalyst selected from compounds of the general formula $RuXY(CO)ZL_2$ wherein X is selected from a halogen atom or a carboxylate group, Y is selected from a halogen atom, a hydrogen atom, a phenyl group, a carboxylate group or a styryl group, Z is selected from CO, pyridine, benzonitrile or no ligand and L is selected from the phosphine ligands of the general formula $PR_3$ in which R is selected from alicyclic or alkyl groups, the improvement being that the hydrogenation is undertaken in the presence of water and an inorganic additive wherein the quantity of water is from about 0.3 to about 1.5 weight percent based on said solvent, and said inorganic additive is selected from the group comprising ferrous sulphate, ammonium sulphate, ferrous ammonium sulphate and cobalt sulphate at a concentration of from about 0.4 to about 1.5 parts by weight per 0.01 parts by weight of ruthenium in the catalyst and from the group comprising sulphuric acid and phosphoric acid at a concentration of from about 0.04 to about 0.2 parts by weight per 0.01 parts by weight of ruthenium in the catalyst and from hydrochloric acid at a concentration of from about 0.01 to about 0.1 parts by weight per 0.01 parts by weight of ruthenium in the catalyst.

DETAILED DESCRIPTION

The nitrile rubber hydrogenated in this invention is a polymer comprising a conjugated $C_4$-$C_6$ diolefin and a $C_3$-$C_5$ unsaturated nitrile. The conjugated $C_4$-$C_6$ diolefin is selected from butadiene, isoprene, piperylene and 2,3-dimethyl butadiene, with butadiene and isoprene being preferred and butadiene being most preferred. The conjugated diolefin forms from about 50 to about 85 percent by weight of the polymer. The $C_3$-$C_5$ unsaturated nitrile is selected from acrylonitrile, methacrylonitrile and ethacrylonitrile, with acrylonitrile being most preferred, and forms from about 15 to about 50 percent by weight of polymer. The polymer may also contain a small amount, that is from about 1 to about 10 percent by weight of the polymer, of an unsaturated carboxylic acid selected from fumaric acid, maleic acid, acrylic acid and methacrylic acid which replaces part of the conjugated diolefin and the conjugated diolefin forms from about 40 to about 84 per cent by weight of the polymer. The nitrile rubber has a molecular weight, as expressed by the Mooney viscosity (ML 1+4 at 100° C.), of from about 25 to about 70. A preferred nitrile rubber is a butadiene-acrylonitrile polymer having an acrylonitrile content of from about 25 to about 45 percent by weight and having a Mooney viscosity (ML 1+4 at 100° C.) of from about 25 to about 60. Nitrile rubber is usually prepared by aqueous emulsion free radical polymerization of the monomers and is recovered as a dry product by well known methods.

The organic solvent used to dissolve the polymer is one which need not be miscible with the aqueous phase but which is a solvent for the polymer and the catalyst. Suitable such solvents include chlorobenzene, dichlorobenzene, toluene, xylene and tetrahydrofuran, chlorobenzene and tetrahydrofuran being preferred. The amount of polymer that is dissolved in said solvent is such as to provide a solution containing from about 3 to about 18, preferably from about 8 to about 15, weight percent of polymer in the solution.

Hydrogen is provided as essentially pure dry gas at a pressure of from about 18 kg/cm$^2$ (about 250 psi) to about 100 kg/cm$^2$ (1420 psi), preferably from about 40 kg/cm$^2$ to about 85 kg/cm$^2$.

The hydrogenation reaction is undertaken in a suitable reaction vessel equipped with a temperature regulating means, catalyst addition means, sampling means and an agitator. The nitrile rubber solution is added to the reaction vessel, water may be added and then the inorganic additive or preferably the inorganic additive is dissolved in water and the solution is added, any necessary degassing is undertaken, and either the catalyst is added followed by pressurizing with hydrogen or the vessel is pressurized with hydrogen and the catalyst is added. The catalyst may be added as the solid material or as a solution in an appropriate solvent. The exact order of addition is not critical. The reactor is heated to the desired temperature. The temperature for the hydrogenation is from about 80° to about 200° C. preferably from about 120° C. to about 180° C. Hydrogen may be added to the reactor during the hydrogenation and the reaction is complete within about 2 to about 24 hours, although when the preferred catalysts are used the reaction time is generally from about 2 to about 8 hours. The degree of hydrogenation may be controlled by control of one or more of the reaction time, temperature or hydrogen pressure, preferably reaction time. On completion of the reaction, the reaction vessel is vented and the polymer recovered by contact with hot water/-steam or an alcohol followed by drying.

The divalent ruthenium catalyst used in the process is selected from compounds of the general formula $RuXY(CO)ZL_2$ wherein X is selected from a halogen atom or a carboxylate group, preferably is a halogen atom and most preferably is chlorine; Y is selected from a halogen atom, a hydrogen atom, a phenyl group, a carboxylate group or a styryl group, preferably is a chlorine atom, a hydrogen atom or a styryl group and most preferably is a hydrogen atom or a styryl group; Z is selected from CO, pyridine, benzonitrile or no ligand and preferably is no ligand; L is selected from phosphine ligands of the general formula $PR_3$ wherein R is selected from alicyclic or alkyl groups. A preferred alicyclic group is cyclohexyl. The alkyl group is preferably selected from isopropyl and secondary butyl and from tertiary butyl when combined with a smaller alkyl group. Preferably R is cyclohexyl.

Specific examples of suitable divalent ruthenium catalysts include carbonylchlorohydrido bis (tricyclohexylphosphine) ruthenium (II), carbonylchloro styryl bis(-tricyclohexylphosphine) ruthenium (II), carbonylchlorostyryl bis(tri-isopropylphosphine) ruthenium (II) and carbonylchlorohydrido bis(tri-isopropylphosphine) ruthenium (II).

The concentration of the ruthenium catalyst is not critical and usually is within the range of from about 0.015 to about 2 percent by weight of the nitrile rubber. For economic reasons it is desirable to minimize the concentration of the ruthenium catalyst and accordingly it is preferably used within the range of from about 0.015 to about 0.15 percent by weight of the nitrile rubber.

The improved process of this invention requires the presence, during the hydrogenation, of both water and an inorganic additive. It has been found that while water alone will influence the reaction, a more desirable effect is achieved when both water and the inorganic additive are present. The amount of water added is from about 0.3 to about 1.5, preferably from about 0.5 to about 1.3, weight percent based on the solvent. The inorganic additive is selected from ferrous sulphate, ammonium sulphate, ferrous ammonium sulphate, cobalt sulphate, sulphuric acid, phosphoric acid and hydrochloric acid. The amount of such additive varies with the nature of the additive. For ferrous sulphate, ammonium sulphate, ferrous ammonium sulphate and cobalt sulphate, the amount of additive is from about 0.4 to about 1.5 parts by weight per 0.01 parts by weight of ruthenium in the catalyst. For sulphuric acid and phosphoric acid, the amount of additive is from about 0.04 to about 0.2, preferably from about 0.05 to about 0.1, parts by weight per 0.01 parts by weight of ruthenium in the catalyst and for hydrochloric acid the amount is from about 0.005 to about 0.1, preferably from about 0.005 to about 0.05, parts by weight per 0.01 parts by weight of the ruthenium in the catalyst. When the additive is present at the required concentration in the hydrogenation reaction, the molecular weight of the hydrogenated nitrile rubber (as measured by the Mooney viscosity or the intrinsic. viscosity) is within the desired range whereas in the absence of the additive the hydrogenated nitrile rubber will have a significantly increased molecular weight or be crosslinked. Preferred additives include ferrous sulphate, cobalt sulphate and ferrous ammonium sulphate. The molecular weight may be measured as the Mooney viscosity determined at 100° C. (ML 1+4 at 100° C.) or at 125° C. (ML 1+4 at 125° C.) or as the intrinsic viscosity determined at 35° C. in monochlorobenzene.

The following examples illustrate the scope of the invention and are not intended to limit the same.

EXAMPLES

Example 1

Hydrogenations were undertaken in a 300 ml stainless steel autoclave equipped with a glass liner and having an agitator, temperature control means, catalyst addition means and sampling means. The nitrile rubber, which was a butadiene-acrylonitrile polymer containing about 38 weight percent of acrylonitrile and having a Mooney viscosity (ML 1+4 at 100° C.) of about 50, was dissolved in 90 ml of chlorobenzene to form a 12 per cent solution. The inorganic additives were dissolved in 1 ml of water and the so-formed solution was added to the nitrile rubber solution in the autoclave. The catalyst was carbonylchlorohydrido bis(tricyclohexylphosphine) ruthenium (II), was placed in the catalyst addition means and was used at a concentration of 0.05 weight percent of catalyst based on the nitrile rubber. The hydrogen pressure was 1200 psi and the hydrogenation temperature Was 145° C. After all components were added to the autoclave, it was sealed and the mixture was degassed by passing hydrogen through for a short time. Hydrogen was left in the autoclave which was then heated to reaction temperature when the hydrogen pressure was raised to 1200 psi and the catalyst was transferred to the reaction mixture. Hydrogen was added during the reaction, as necessary, to maintain the pressure constant. Details are provided in Table 1 in which Additive A is ammonium sulphate, Additive B is ferrous sulphate and Additive C is cobalt sulphate. For the reaction product, the hydrogenation (Hydro % in the Table) was determined by IR spectroscopy and the intrinsic viscosity (Int. Visc. in the Table) was determined using chlorobenzene at 35° C. in an Ubbelohde viscometer. Also in Table 1, Add. Ratio means the weight of the additive per 0.01 g of ruthenium in the catalyst.

Example 2

Using the procedure and conditions of Example 1 except that the nitrile rubber was used as a 9.3 per cent solution and the hydrogen pressure was 800 psi, further additives were evaluated as shown in Table 2. In Table 2, Additive D is ferrous ammonium sulphate.

Example 3

Using the procedure described in Example 1, hydrochloric, sulphuric and phosphoric acids were evaluated as additives. Additive E is hydrochloric acid, Additive F is sulphuric acid and Additive G is phosphoric acid. Table 3 provides the data from which it is clear that the concentration ranges for these additives are critical—for sulphuric acid, the Additive Ratio of 0.51 leads to a gelled product and of 0.026 leads to a product showing no drop in intrinsic viscosity.

Example 4

Following the procedure of Example 1, using sulphuric acid as the additive, two other ruthenium catalysts were used. In Table 4, Catalyst A is carbonylchloro styryl bis(tricyclohexylphosphine) ruthenium (II) and Catalyst B is carbonylchloro styryl bis(tri-isopropyl-phosphine) ruthenium (II).

TABLE 1

| | EXPT # | | |
|---|---|---|---|
| | 1 | 2 | 3 |
| Additive | A | B | C |
| Wt. of Add. (g) | 0.041 | 0.041 | 0.041 |
| Add. Ratio | 0.43 | 0.43 | 0.43 |
| Time (hr) | 3 | 4 | 2.5 |
| Hydrog. (%) | 99.8 | 99.1 | 99.6 |
| Int. Visc. (dl/g) | 1.7 | 1.64 | 1.61 |

TABLE 2

| | EXPT # | | | |
|---|---|---|---|---|
| | 1 | 2 | 3 | 4 |
| Additive | NONE | D | D | C |
| Wt. of Add. (g) | — | 0.102 | 0.026 | 0.082 |
| Add. Ratio | — | 0.44 | 0.37 | 1.15 |
| Time (hr) | 3.5 | 3 | 2.5 | 3 |
| Hydrog. (%) | 99.3 | 99.7 | 99.4 | 99.7 |
| Int. Visc. (dl/g) | 1.88 | 1.62 | 1.59 | 1.59 |

TABLE 3

| | EXPT # | | | | |
|---|---|---|---|---|---|
| | 1 | 2 | 3 | 4 | 5 |
| Additive | E | F | F | F | G |
| Wt. of Add. (g) | 0.0018 | 0.049 | 0.0049 | 0.0024 | 0.0035 |
| Add. Ratio | 0.019 | 0.51 | 0.051 | 0.026 | 0.037 |
| Time (hr) | 3.5 | 4 | 2.7 | 2.5 | 3 |
| Hydrog. (%) | 99.5 | 99.3 | 99.7 | 99.7 | 99.6 |
| Int. Visc. (dl/g) | 1.67 | GEL | 1.64 | 1.94 | 1.80 |

TABLE 4

| | EXPT # | |
|---|---|---|
| | 1 | 2 |
| Catalyst | A | B |
| Wt. of Add. (g) | 0.0048 | 0.0048 |
| Add. Ratio | 0.05 | 0.05 |
| Time (hr) | 2.5 | 4 |
| Hydrog. (%) | 99.7 | 97.0 |
| Int. Visc. (dl/g) | 1.62 | 1.81 |

What is claimed is:

1. An improved process for the production of hydrogenated nitrile rubber wherein a nitrile rubber which is a polymer comprising a conjugated $C_4$–$C_6$ diolefin and a $C_3$–$C_5$ unsaturated nitrile is hydrogenated in solution in an organic solvent in the presence of a divalent ruthenium catalyst selected from compounds of the general formula $RuXY(CO)ZL_2$ wherein X is selected from a halogen atom or a carboxylate group, Y is selected from a halogen atom, a hydrogen atom, a phenyl group, a carboxylate group or a styryl group, Z is selected from CO, pyridine, benzonitrile or no ligand and L is selected from the phosphine ligands of the general formula $PR_3$ in which R is selected from alicyclic or alkyl groups, the improvement being that the hydrogenation is undertaken in the presence of water and an inorganic additive wherein the quantity of water is from about 0.3 to about 1.5 weight percent based on said solvent, and said inorganic additive is selected from the group comprising ferrous sulphate, ammonium sulphate, ferrous ammonium sulphate and cobalt sulphate at a concentration of from about 0.4 to about 1.5 parts by weight per 0.01 parts by weight of ruthenium in the catalyst or from the group comprising of sulphuric acid and phosphoric acid at a concentration of from about 0.04 to about 0.2 parts by weight per 0.01 parts by weight of ruthenium in the catalyst or from hydrochloric acid at a concentration of from about 0.005 to about 0.1 parts by weight per 0.01 parts by weight of ruthenium in the catalyst.

2. The process of claim 1 wherein the nitrile rubber is a polymer of butadiene and acrylonitrile containing from about 15 to about 50 weight percent of acrylonitrile, the concentration of ruthenium catalyst is from about 0.015 to about 2 percent by weight of the nitrile rubber and the hydrogenation temperature is from about 80° to about 200° C.

3. The process of claim 2 wherein the organic solvent is selected from chlorobenzene, toluene, xylene, dichlorobenzene and tetrahydrofuran and the concentration of polymer in the solvent is from about 3 to about 18 weight percent.

4. The process of claim 1 wherein the catalyst is selected from carbonylchlorohydrido bis(tricyclohexylphosphine) ruthenium (II), carbonylchloro styryl bis(-tricyclohexylphosphine) ruthenium (II), carbonylchlorostyryl bis(tri-isopropylphosphine) ruthenium (II) and carbonylchlorohydrido bis(tri-isopropylphosphine) ruthenium (II) present at a concentration of from about 0.015 to about 0.15 percent by weight of the nitrile rubber.

5. The process of claim 1 wherein the inorganic additive is selected from ferrous sulphate, cobalt sulphate and ferrous ammonium sulphate.

6. The process of claim 4 wherein the inorganic additive is selected from ferrous sulphate, cobalt sulphate and ferrous ammonium sulphate.

7. The process of claim 1 wherein the hydrogen pressure is from about 18 to about 100 kg/cm$^2$.

8. The process of claim 1 wherein the nitrile rubber contains from about 25 to about 45 weight percent of acrylonitrile, the organic solvent is chlorobenzene, the catalyst is selected from carbonylchlorohydrido bis(-tricyclohexylphosphine) ruthenium (II) and carbonylchloro styryl bis (tricyclohexylphosphine) ruthenium (II) at a concentration of from about 0.015 to about 0.15 percent by weight of the nitrile rubber, the hydrogen pressure is from about 40 to about 85 kg/cm$^2$, the hydrogenation temperature is from about 120° to about 180° C. and the inorganic additive is selected from ferrous sulphate, cobalt sulphate and ferrous ammonium sulphate.

* * * * *